US011818681B2

(12) United States Patent
Hauck et al.

(10) Patent No.: US 11,818,681 B2
(45) Date of Patent: *Nov. 14, 2023

(54) METHODS AND ARCHITECTURES FOR SECURE RANGING

(71) Applicant: Apple Inc., Cupertino, CA (US)

(72) Inventors: Jerrold V. Hauck, Windermere, FL (US); Alejandro J. Marquez, Sunnyvale, CA (US); Timothy R. Paaske, San Jose, CA (US); Indranil S. Sen, Cupertino, CA (US); Herve Sibert, San Francisco, CA (US); Yannick L. Sierra, San Francisco, CA (US); Raman S. Thiara, San Jose, CA (US)

(73) Assignee: APPLE INC., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/582,785

(22) Filed: Jan. 24, 2022

(65) Prior Publication Data
US 2022/0225267 A1  Jul. 14, 2022

Related U.S. Application Data

(63) Continuation of application No. 16/090,007, filed as application No. PCT/US2017/027792 on Apr. 14, 2017, now Pat. No. 11,265,929.
(Continued)

(51) Int. Cl.
*H04W 64/00* (2009.01)
*H04W 12/03* (2021.01)
(Continued)

(52) U.S. Cl.
CPC ........... *H04W 64/00* (2013.01); *H04L 9/3273* (2013.01); *H04L 63/061* (2013.01);
(Continued)

(58) Field of Classification Search
CPC ..... H04L 9/002; H04L 9/0662; H04L 9/0825; H04L 9/0869; H04L 9/3273;
(Continued)

(56) References Cited

U.S. PATENT DOCUMENTS 8,289,211 B1 * 10/2012 Truong ................... G01S 11/02
342/463
8,587,403 B2    11/2013 Ghabra et al.
(Continued)

FOREIGN PATENT DOCUMENTS

CN    101400057 A    4/2009
CN    101674623 A    3/2010
(Continued)

OTHER PUBLICATIONS

PCT International Search Report for PCT/US2017/027792 dated Nov. 24, 2017, 3 pages.
(Continued)

*Primary Examiner* — Khoa Huynh
(74) *Attorney, Agent, or Firm* — Womble Bond Dickinson (US) LLP

(57) ABSTRACT

A secure ranging system can use a secure processing system to deliver one or more ranging keys to a ranging radio on a device, and the ranging radio can derive locally at the system ranging codes based on the ranging keys. A deterministic random number generator can derive the ranging codes using the ranging key and one or more session parameters, and each device (e.g. a cellular telephone and another device) can independently derive the ranging codes and derive them contemporaneously with their use in ranging operations.

20 Claims, 9 Drawing Sheets

Related U.S. Application Data

(60) Provisional application No. 62/420,360, filed on Nov. 10, 2016, provisional application No. 62/322,780, filed on Apr. 14, 2016.

(51) Int. Cl.

| | | |
|---|---|---|
| *H04W 12/033* | (2021.01) | |
| *H04W 12/041* | (2021.01) | |
| *H04W 12/062* | (2021.01) | |
| *H04W 12/63* | (2021.01) | |
| *H04W 12/065* | (2021.01) | |
| *H04W 12/069* | (2021.01) | |
| *H04W 12/0431* | (2021.01) | |
| *H04W 12/0433* | (2021.01) | |
| *H04W 12/0471* | (2021.01) | |
| *H04W 76/10* | (2018.01) | |
| *H04L 9/32* | (2006.01) | |
| *H04L 9/40* | (2022.01) | |
| *H04W 12/02* | (2009.01) | |
| *H04W 12/04* | (2021.01) | |
| *H04W 12/06* | (2021.01) | |
| *H04W 12/47* | (2021.01) | |
| *H04W 12/33* | (2021.01) | |
| *H04W 4/80* | (2018.01) | |

(52) U.S. Cl.
CPC ......... *H04L 63/0869* (2013.01); *H04W 12/02* (2013.01); *H04W 12/03* (2021.01); *H04W 12/033* (2021.01); *H04W 12/04* (2013.01); *H04W 12/041* (2021.01); *H04W 12/0431* (2021.01); *H04W 12/0433* (2021.01); *H04W 12/0471* (2021.01); *H04W 12/06* (2013.01); *H04W 12/062* (2021.01); *H04W 12/065* (2021.01); *H04W 12/069* (2021.01); *H04W 12/63* (2021.01); *H04W 76/10* (2018.02); *H04L 63/0492* (2013.01); *H04W 4/80* (2018.02); *H04W 12/33* (2021.01); *H04W 12/47* (2021.01)

(58) Field of Classification Search
CPC ............... H04L 63/0492; H04L 63/061; H04L 63/0869; H04L 63/18; H04L 2209/085; H04W 4/80; H04W 12/02; H04W 12/03; H04W 12/033; H04W 12/04; H04W 12/041; H04W 12/0431; H04W 12/0433; H04W 12/0471; H04W 12/06; H04W 12/062; H04W 12/065; H04W 12/069; H04W 12/33; H04W 12/47; H04W 12/50; H04W 12/63; H04W 64/00; H04W 76/10
See application file for complete search history.

(56) References Cited

U.S. PATENT DOCUMENTS

| | | | |
|---|---|---|---|
| 8,930,045 | B2 | 1/2015 | Oman et al. |
| 9,349,236 | B2 | 5/2016 | Mutti et al. |
| 2007/0195956 | A1* | 8/2007 | Gavette .................. H04L 63/06 380/277 |
| 2010/0110979 | A1 | 5/2010 | Chen et al. |
| 2011/0164592 | A1 | 7/2011 | Liu et al. |
| 2011/0271331 | A1* | 11/2011 | Adams .................. H04W 12/50 726/6 |

FOREIGN PATENT DOCUMENTS

| | | |
|---|---|---|
| EP | 1216172 | 6/2002 |
| KR | 1020120125185 | 11/2012 |
| WO | 2015084852 | 6/2015 |

OTHER PUBLICATIONS

PCT Written Opinion of the International Searching Authority for PCT/US2017/027792 dated Nov. 24, 2017, 5 pages.
Manuel Flury et al., "Effectiveness of distance-decreasing attacks against impulse radio ranging", Proceedings of the Third ACM Conference on Wireless Network Security, Mar. 22-24, 2010, Hoboken, New Jersey, USA, Jan. 1, 2010, p. 117, XP55401041, ISBN: 978-1-60558-923-7.
Alfred J. Menezes, Paul C. van Oorschot, Scott A. Vanstone, "Handbook of Applied Cryptography", Oct. 16, 1996, CRC Press on Discrete Mathematics and its Applications, XP002774099, ISBN: 0-8493-8523-7, pp. 13-16.
Notice of Preliminary Rejection for Korean Patent Application No. 10-2018-7029207, dated Jun. 18, 2019, 2 pages.
Notification of the First Office Action for Chinese Patent Application No. 201780023226.5 dated Apr. 26, 2020, 6 pages.
PCT International Preliminary Report on Patentability for PCT/US2017/027792 dated Oct. 25, 2018, 7 pages.
Examination Report for European Patent Application No. 17733582.5 dated Feb. 15, 2023, 3 pages.
Jia-Lin Hu, Qing-Hao Meng, Xu-Dong Bian, Xue Yang, Ming Zeng, "Performance Analysis for the Ultrasonic Spread Spectrum Ranging System Excited with Pulse Codes", 2012 5th International Congress on Image and Signal Processing (CISP 2012), pp. 1518-1522, downloaded on May 26, 2020.

\* cited by examiner

METHODS AND ARCHITECTURES FOR SECURE RANGING

This application is a continuation of U.S. application Ser. No. 16/090,007, filed Sep. 28, 2018, which claims the benefit of U.S. National Phase Application under 35 U.S.C. 371 of International Application No. PCT/US17/27792, filed Apr. 14, 2017, entitled Methods And Architectures For Secure Ranging, which is related to and claims the benefit of U.S. Provisional Patent Application No. 62/420,360, filed Nov. 10, 2016 and U.S. Provisional Patent Application No. 62/322,780, filed Apr. 14, 2016.

BACKGROUND

Ultra wide band radios based upon the IEEE standard known as IEEE 802.15.4a can provide precision ranging which can be used to measure or determine the distance between two objects each of which includes one of these radios. Further information about ranging according to that standard can be found in the article "Ranging in the IEEE 802.15.4a standard" by Zafer Sahinoglu and Sinan Gezici from Mitsubishi Electric Research Laboratories, 2006.

SUMMARY OF THE DESCRIPTION

Secure ranging, through the use of ranging codes which are independently generated by or derived from one or more ranging keys, can be used in radio (wireless) communication between devices, such as between (1) two smartphones or (2) a smartphone or wearable device and another device to allow both devices to separately determine the distance or range between the devices based on the time of flight of the received signals. Secure ranging aims at providing a guarantee of the proximity of two devices. Combined with mutual authentication it can be used to provide an increased level of security against relay attacks for wireless interaction. Once mutually authenticated the devices can gain the assurance that they are close to one another and they may engage in further interactions that may require this assurance. Proximity assurance may be used as a replacement for, or in addition to, user consent usually indicated by the entry of a passcode or a fingerprint, etc. Examples of interactions enabled by proximity verification can include exchanging data such as the state of devices or sending policy information or accepting policy information or sending commands or unlocking of the another device.

In one embodiment, a data processing system can include: a first radio transceiver configured to transmit a locally generated pseudorandom ranging code and to use a locally generated code sequence for correlation with the received ranging code to determine a range between the data processing system and another system, such as the another device; an application processing system configured to process one or more user applications, such as the cellular telephony user application; and a secure processing system and/or a secure element coupled to the application processing system and coupled to the first radio transceiver through one or more hardware buses, the secure processing system configured to establish an encrypted communication channel between the first radio transceiver and the secure processing system and configured to provide one or more ranging keys to the first radio transceiver to allow the first radio transceiver to generate the locally generated pseudorandom ranging codes. In one embodiment, the first radio transceiver is an ultra wide band radio frequency transceiver and the data processing system includes a cellular telephone transceiver.

In one embodiment, the system can further include a second radio transceiver, such as a Bluetooth transceiver or a WiFi transceiver or a near field communication (NFC) transceiver or other types of radios coupled to the application processing system and to the secure processing system; the second radio transceiver can be configured to provide network communications (or other types of communication) between the another device and the data processing system which can be a cellular telephone or watch which can unlock the another device after a secure ranging operation between the cellular telephone and the another device.

In one embodiment, secure elements, which can be part of a secure element processing system in each device, can perform a setup operation using, for example, a Bluetooth transceiver on each device to establish a secure communication channel and then to mutually authenticate each secure processing element and then to perform a secure key exchange to provide a set of one or more ranging keys and one or more data keys which can be used to encrypt timestamped information used in the ranging process. In one embodiment, the one or more ranging keys generated through the secure key exchange can be provided, in encrypted form, to an ultra wide band radio transceiver which is configured to perform time of flight ranging operations using pseudorandom codes with another ultra wide band radio on the other device.

In another embodiment, one or more devices can perform a method which can include: receiving an encrypted ranging key from a processing system in a first device; decrypting the encrypted ranging key; determining one or more session parameters; deriving, locally at the first device, a code sequence from the ranging key and the one or more session parameters; receiving a code sequence from a second device; performing a correlation operation on the received code sequence with the derived code sequence to determine whether the received code sequence matches the derived code sequence; and determining a range between the first device and the second device based on the correlation between the received code sequence and the derived code sequence. In one embodiment, each of the first device and the second device independently and separately derive the derived code sequence contemporaneously with the correlation operations, and the first device can be a cellular telephone or smartphone or watch and the second device can be a mobile system which includes a plurality of ranging radios each of which separately and independently perform the correlation operations and also derive the derived code sequence. In one embodiment, the derived code sequence is derived just-in-time for the correlation operations that use the derived code sequence. In one embodiment, a successful ranging operation causes the cellular telephone or smartphone or watch to unlock the another device and can provide user data to the another device, where the user data can include one or more of: user settings for the another device (e.g. which lights to turn on in the user's house or apartment) or contact or identification information or destination information, etc. In one embodiment, the session parameters can include at least one of: one or more sequence identifiers; or one or more session identifiers; or one or more transmitter identifiers. In one embodiment, the derived code sequence is derived by a deterministic random number generator that receives, as an input, a seed created by the combination of the ranging key and the one or more session parameters.

The methods and systems described herein can be implemented by data processing systems, such as one or more smartphones, tablet computers, laptop computers, smart watches, wearable devices, audio accessories, onboard computers within the another device, and other data processing systems and other consumer electronic devices. The methods and systems described herein can also be implemented by one or more data processing systems which execute executable computer program instructions stored in one or more non-transitory machine readable media that cause the one or more data processing systems to perform the one or more methods described herein when the programming instructions are executed. Thus the embodiments described herein can include methods, data processing systems, and non-transitory machine readable media.

The above summary does not include an exhaustive list of all embodiments in this disclosure. All systems and methods can be practiced from all suitable combinations of the various aspects and embodiments summarized above, and also those disclosed in the Detailed Description below.

BRIEF DESCRIPTION OF THE DRAWINGS

The present invention is illustrated by way of example and not limitation in the figures of the accompanying drawings in which like references indicate similar elements.

DETAILED DESCRIPTION

Various embodiments and aspects will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments.

Reference in the specification to "one embodiment" or "an embodiment" means that a particular feature, structure, or characteristic described in conjunction with the embodiment can be included in at least one embodiment. The appearances of the phrase "in one embodiment" in various places in the specification do not necessarily all refer to the same embodiment. The processes depicted in the figures that follow are performed by processing logic that comprises hardware (e.g. circuitry, dedicated logic, etc.), software, or a combination of both. Although the processes are described below in terms of some sequential operations, it should be appreciated that some of the operations described may be performed in a different order. Moreover, some operations may be performed in parallel rather than sequentially.

Figure 1:
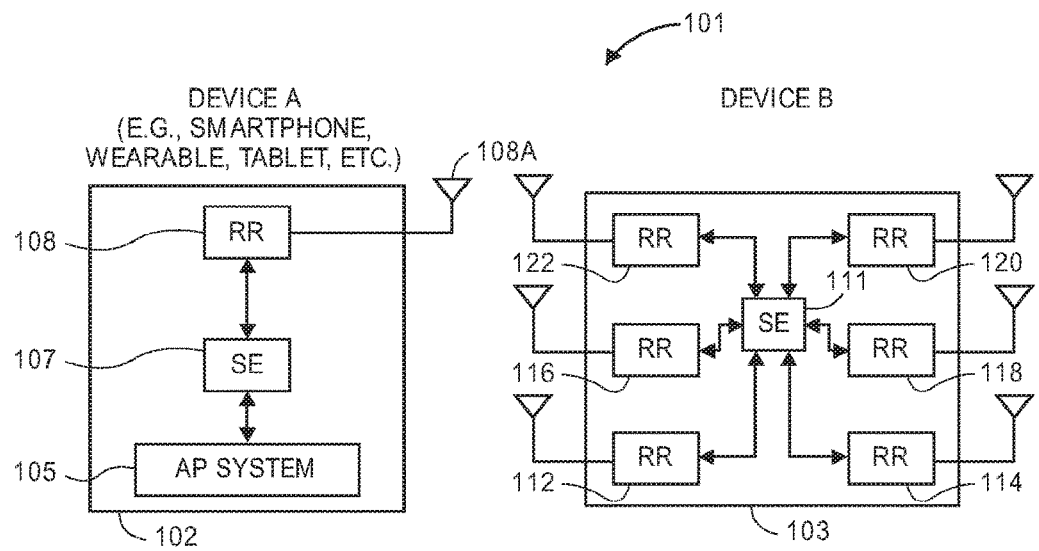
FIG. 1 shows an example of a system for performing secure ranging between two devices.
Figure 8:
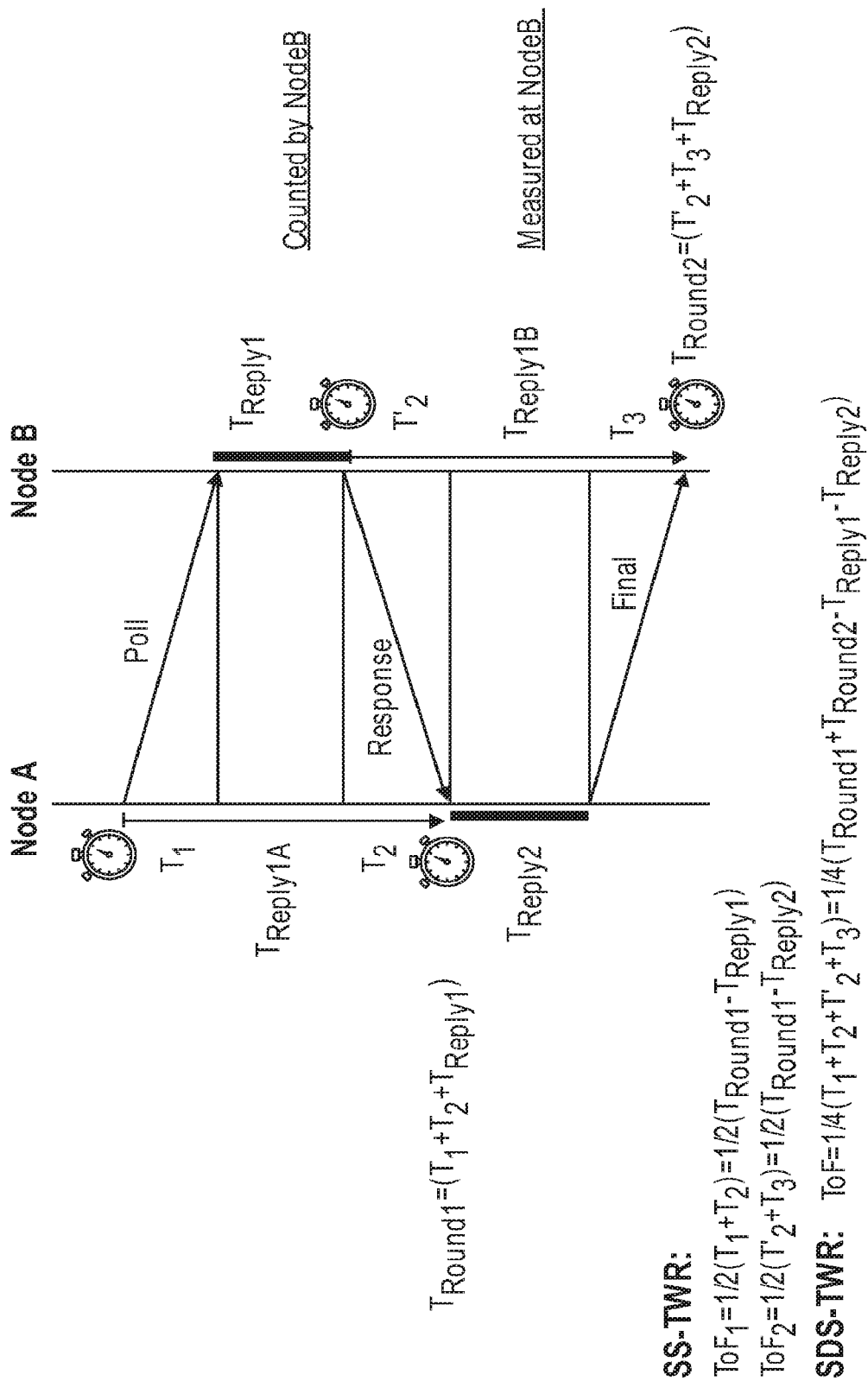
FIG. 8 shows a diagram illustrating a two way ranging operation which can be used in one or more embodiments described herein.

The system 101 shown in FIG. 1 can be used to perform secure ranging in one embodiment between two devices that can be referred to as Device A and Device B. Device A can be, for example, a smartphone, a wearable device (such as a watch), or a tablet computer or other data processing system and Device B can be another data processing system or another device such as a mobile system which includes a secure processing element in one embodiment. In one embodiment Device B or the another device can be, for example, a door, a house, an apartment, a shed, a gate or a motorized device or vehicle, a mobile system, a bicycle, a safe, a safety deposit box, a closet, a laptop computer, a desktop computer, a tablet computer, a server computer system, a smartphone, a wearable device (e.g. a smart watch), a padlock, a chest, an RFID reader, an RFID tag, etc. The device 102 shown as Device A in FIG. 1 can include a secure enclave or secure element processing system 107 and an application processing system 105 which are coupled together. The application processing system 105 can, for example, execute user programs such as telephony or text messaging applications or web browser applications, etc. The secure element processor 107 can perform cryptographic operations such as encrypting or decrypting files on the device 102 or performing other security operations such as receiving and protecting user passcodes or user's fingerprints, etc. The device 102 can also include one or more ranging radios such as ranging radio 108 which is coupled to antenna 108A. The ranging radio (RR) 108 can be implemented as an ultra wide band radio that is similar to radios that implement the IEEE standard known as IEEE 802.15.4a. The ranging radio 108 can transmit pseudorandom ranging codes to ranging radios on the device 103 and can receive transmissions of such codes. In one embodiment, two way ranging can be employed in which the ranging radio 108 transmits a first code sequence to one or more of the ranging radios on device 103, and each of those ranging radios responds with a code sequence which is transmitted back to the ranging radio 108 which can then respond to a code sequence from one of the ranging radios on device 103. FIG. 8 shows an example of a two way ranging operation between two ranging radios. In the example shown in FIG. 1, the device 103 can be the another device which includes one or more ranging radios. In the example shown in FIG. 1, there are six ranging radios distributed around the periphery of the another device to allow Device A (device 102) and Device B (device 103) to perform triangulation to locate the another device relative to the device 102 which can be a smartphone. It will be appreciated that fewer than six ranging radios can be employed in alternative embodiments. It will also be appreciated that device 103 may use a single ranging radio but have antennas dispersed across the another device, where the ranging radio can perform time division multiplexing with the different antennas to provide the same result as six ranging radios dispersed around the another device. Each of the ranging radios in device 103 includes a corresponding antenna which is coupled to the radio. The ranging radios 112, 114, 116, 118, 120, and 122 are coupled through one or more buses to a secure processing element 111 (e.g., secure enclave or secure element processor) in the device 103. The secure element processing system 111 and the secure element processing 107 can perform the method shown in FIG. 3 or the method shown in FIG. 5. Moreover, each of the ranging radios 108, 112, 114, 116, 118, 120, and 122 can be implemented in the form shown in FIG. 4 in order to allow for the local and independent generation of ranging codes from one or more ranging keys that are established by the secure element processing system 107 and secure element processing system 111.

In one embodiment, a first communication channel can be established using a different radio protocol or communication channel than the ranging communication channel. For example, a Bluetooth radio or WiFi radio or NFC radio can be used on each device to establish a secure connection between the devices to then allow the secure elements on each device to perform a secure key exchange from which the ranging keys can be derived or generated.

A wireless communication channel such as Bluetooth (BT) or WiFi or NFC radio or other wireless channel can be used for its higher efficiency and also as it supports an already well-defined secure transport protocol. The establishment of this channel already provides a hint of proximity but is vulnerable to relay attacks where the attacker acts as a simple repeater in between the two devices and thus can have devices believe they are within the range one from another, while this is false. This vulnerability of existing wireless protocols to relay attacks can be the core rationale for performing secure ranging.

In order to prepare for secure ranging, key material can be exchanged using a wireless communication channel different from the one used by secure ranging (and thus possibly vulnerable to relay attacks).

When the devices get in the range one from another for this initial wireless communication channel (BT/WiFi, NFC radios, other radios), the channel is used to initiate the communication, which may provide a first level of encryption to enable perfect forward secrecy.

The underlying technology such as BT or WiFi or NFC radios can provide mutual authentication through pre-established pairing. In terms of privacy, Bluetooth Low Energy (from version 4.2) supports privacy-preserving channel establishment between already paired devices, allowing devices to use seemingly random identifiers.

Using this first channel, the secure processors (e.g., secure elements processing system 107 and 111) on both end-point devices may establish, at an application level, a mutual authenticated key exchange using previously exchanged information known by the secure processor on each side (shared symmetric key or respective public key). An example of such a scheme is the Secure Channel Protocol 11 defined by GlobalPlatform. The resulting exchanged key is denoted by K_AB. Note that as a result of the exchange, one or multiple keys may be shared, for instance if a common secret is generated and then used to derive multiple keys. In this case, K_AB denotes the set of all these keys, and is referred to generically as "key material".

In order to achieve the privacy goal and prevent tracking of user, the secure processors may not release any identifier or linkable item until authentication of the other party has succeeded, and this identifier shall be encrypted so that it is not visible to an eavesdropper. The security provided by, for instance, the secure Bluetooth channel, provides both authentication and encryption, so that the secure processors channel may not have to add additional tweaks to its authenticated key exchange protocol.

An important feature of this architecture is the ability, in one embodiment, to combine the key material of the communication channel/application processor and the secure processor channel in order to increase the security. This feature can provide privacy benefits, that combine perfect forward secrecy from the communication layer with improved performance and strong mutual authentication from the secure processors.

Hence, in an embodiment, the key material K_AB exchanged at an application level by the secure processors is combined with other key material from, for example, the BT/WiFi or NFC connection and/or other parts of the transcripts of the protocols, before being used further. Such an example of other key material is the Bluetooth link key, which is the 128-bit secret key shared by two devices as the result of their successful Bluetooth pairing, which is reused afterwards for further connections between the two already paired devices. K_AB and the link key can thus be injected into a standard key derivation function in order to obtain new material that replaces K_AB. Instead of the link key itself, one could use a key derived from the link key, or even, if it is available to the SW, the Bluetooth session key or a value derived from this latter.

Figure 9:
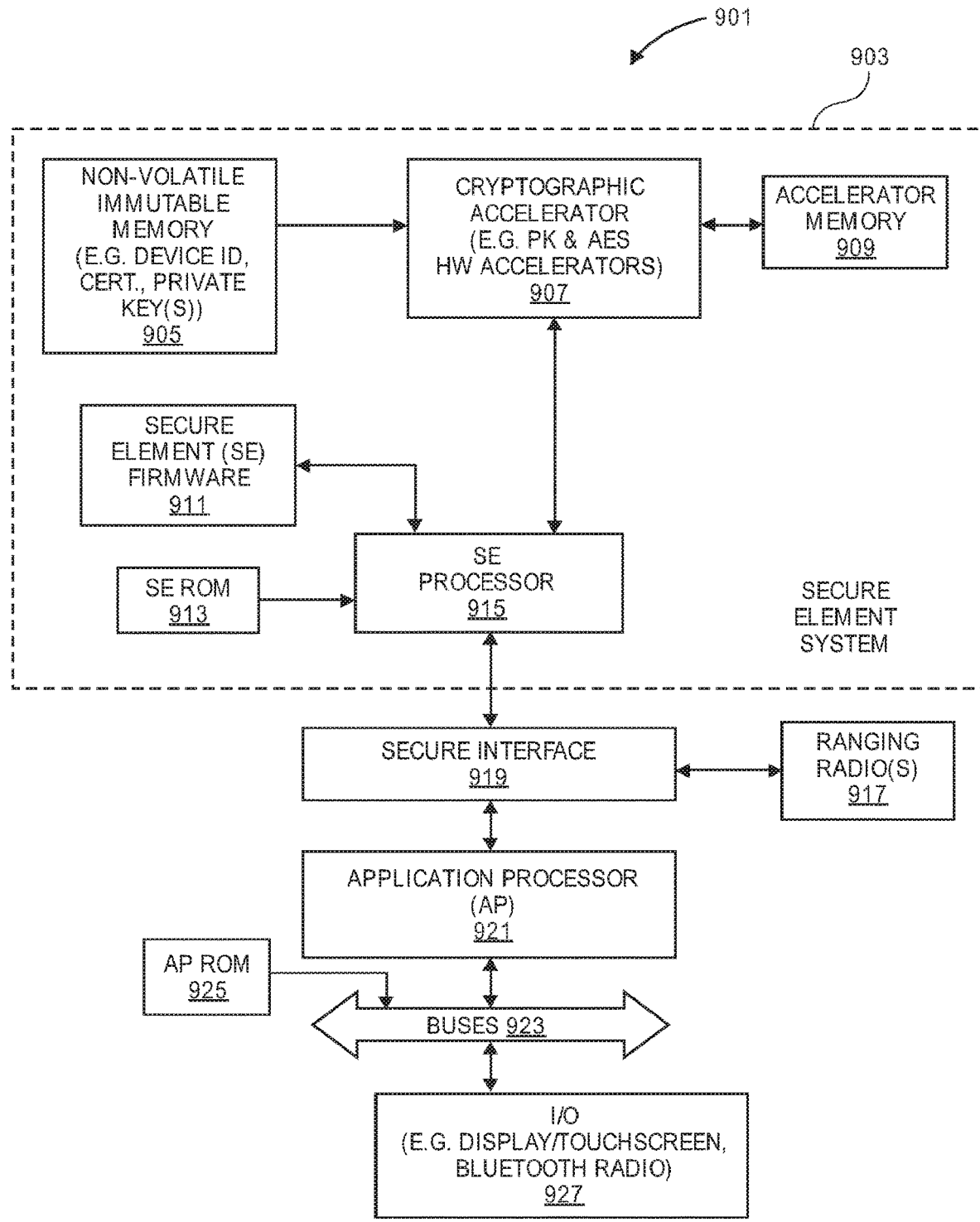
FIG. 9 is a block diagram showing an example of a data processing system which includes a secure element system and an application processor system coupled together through a secure interface.

The key material K_AB can then be used for the following use cases:
  1) Key confirmation: both parties thereby confirm they generated the same key and bind the BT/WiFi connection and the mutual authentication sessions—i.e. they get the guarantee that the entity they are communicating with on WiFi/BT is the same entity whose secure processor has been authenticated.
  2) Secure ranging: the shared key (denoted K_AB) can be used to generate unpredictable signals such as preambles or ranging codes for use in a ranging radio, or to protect exchanged data in the ranging radios.
  3) Data transfer: before/after secure ranging is done, this key material can be used to protect the integrity and confidentiality of the data being transferred between the two parties.
  4) Long-term pre-shared secret establishment: in an embodiment, the shared key K_AB generated through the mutual authenticated key exchange between the secure processors is kept as a long-term secret MK_AB and retained within the secure processors boundary (e.g. within secure element system 903 shown in FIG. 9). It is then used during further iterations in another type of mutual authenticated key exchange protocol between the secure processors. The goal is to use, in one embodiment, a full-fledged asymmetric key-based protocol such as secure channel protocol 11 (SCP11) only once, or once every several thousands of time, for instance, and then replace SCP11 with a simpler protocol based on pre-shared symmetric keys, such as secure channel protocol 3 (SCP03) wherein each party sends out a random challenge and a shared session key is derived from the pre-shared key and the concatenation of both challenges. FIG. 5 shows an example of a method which uses these two different protocols.

In an embodiment, the key material K_AB is not used as is for use cases 1, 2 and 3, but instead, for each of the use case, K_AB is derived into specific session key material dedicated for this use case and this session only. For instance, instead of using K_AB for secure ranging, K_AB is derived using parameters exchanged by the two devices into key material denoted by K_AB_R to be used only for secure ranging. The derivation function could be, for instance, the X9.63 Key Derivation Function.

In an embodiment, the key material used for use case 3 can be modified once the secure ranging operation has been completed to make a clear separation between data exchange before and after guarantee of proximity.

Figure 2:
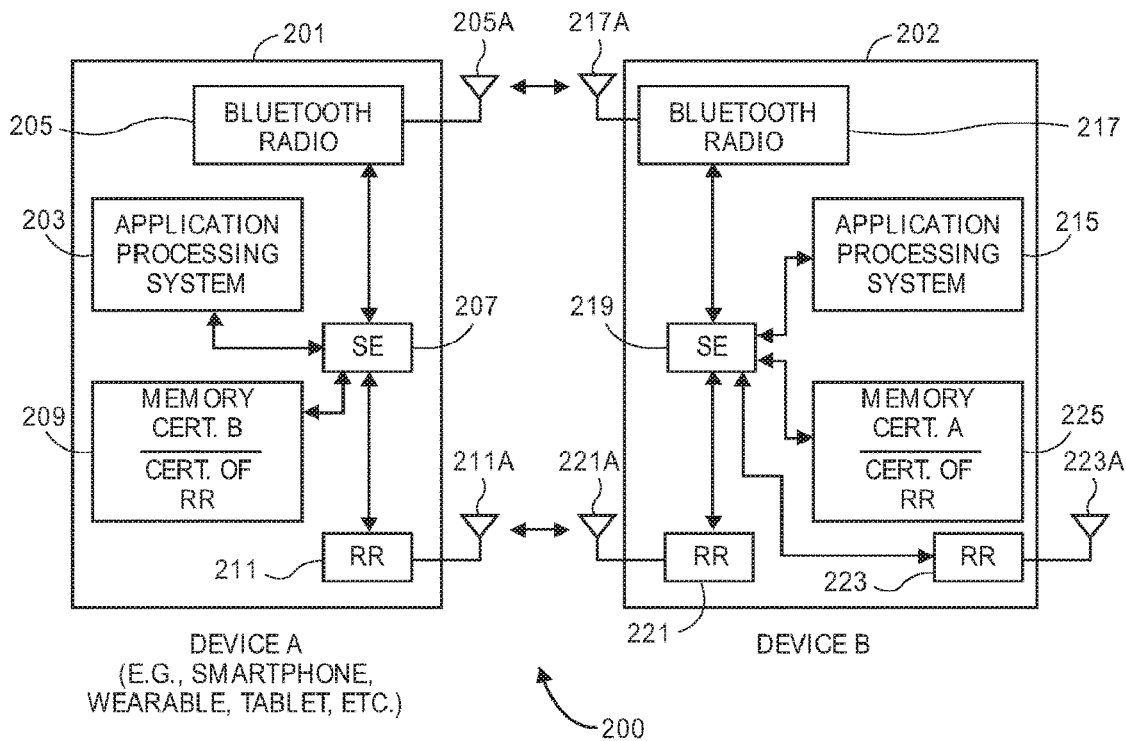
FIG. 2 shows an example of a system for performing secure ranging between two devices, each of which includes a ranging radio and a Bluetooth radio.
Figure 4:
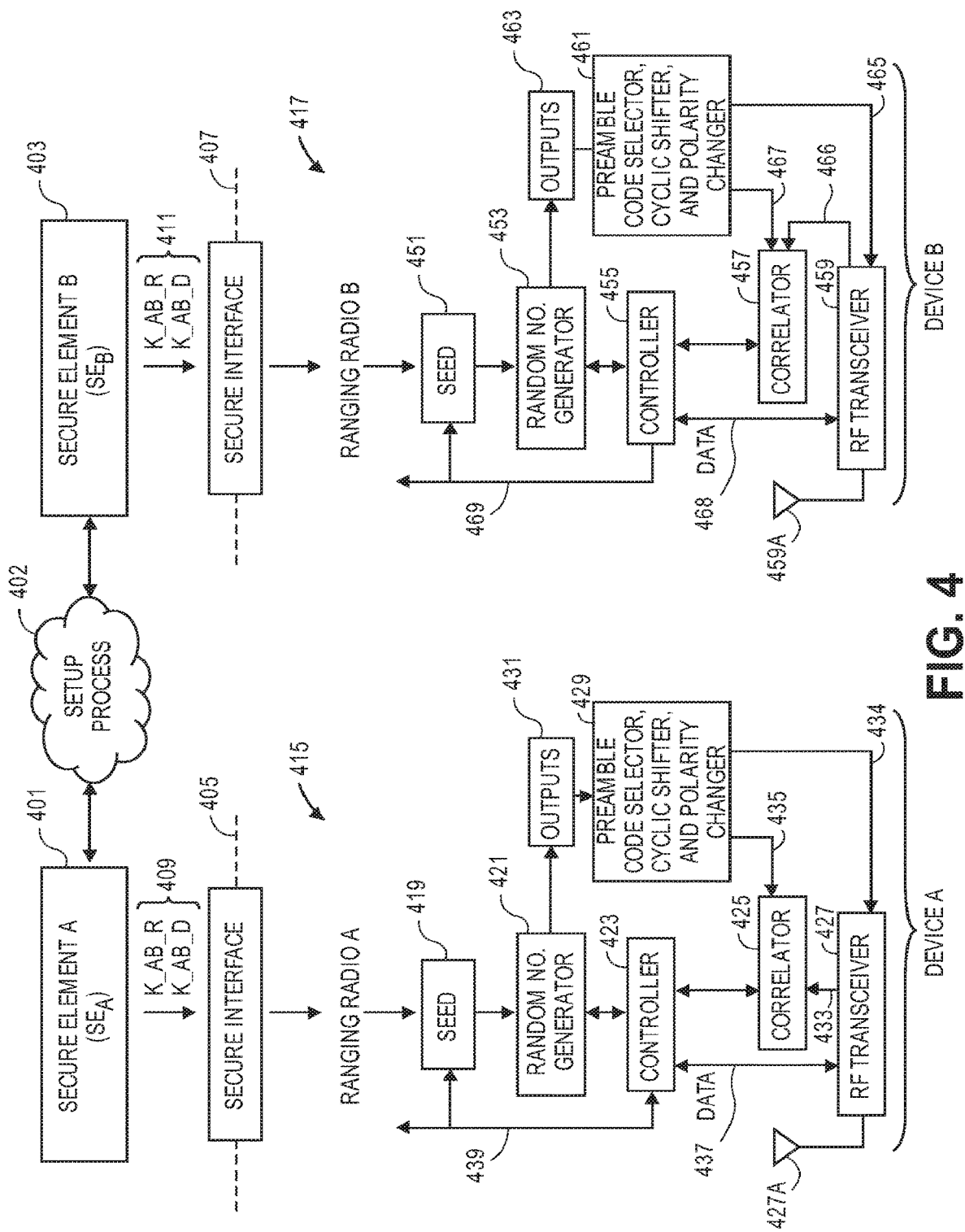
FIG. 4 shows an example of a system for performing secure ranging in which the ranging codes are independently and locally generated on each device contemporaneously with the correlation operations used to perform secure ranging.

FIG. 2 shows an example of a ranging system 200 which includes a device 201 and a device 202 which can communicate through both ranging radios, such as ranging radio 211 on device 201 and ranging radios 221 and 223 on device 202. In addition, each device in the system 200 shown in FIG. 2 includes, for example, a Bluetooth radio, such as Bluetooth radio 205 in device 201 and Bluetooth radio 217 in device 202. Each Bluetooth radio includes an antenna which is coupled to the Bluetooth radio to allow the radios to transmit and receive signals between the two Bluetooth radios. In one embodiment, the Bluetooth radio can be used to establish a secure connection for use by the secure element processors 207 and 219 to establish one or more ranging keys as described herein. In an alternative embodiment, another radio such as a WiFi or NFC radio can be used as an alternative to the Bluetooth radio. The application processing system 203 and the application processing system 215 on each device can provide for the execution of user programs, such as cellular telephony programs or navigation programs or text messaging programs, etc. Moreover, these user application programs can provide user interfaces to allow a user to set up one device, such as a smartphone to unlock another device by merely walking up to the another device (e.g., Device B) with the smartphone in the user's pocket or purse, etc. or while the user is wearing a wearable device configured to unlock the another device. Each device in the system shown in FIG. 2 can include a memory (e.g., memories 209 and 225) which stores cryptographic values or parameters, such as certificates which can be used in cryptographic operations to authenticate or encrypt or otherwise secure communications within a device and between the devices. In particular, memory 209 can include a certificate for the device 202 (shown as cert B) as well as a certificate for the ranging radio within each device. In one embodiment, memories 209 and 225 are accessible only by the secure elements 107 and 111. In one embodiment, the secure element processing system is coupled to both the Bluetooth radio and the ranging radios through a secure interface. Such secure interface is illustrated in FIG. 4 below. This secure interface can be similar to the secure interface between the secure enclave processor and the application processing system within the iPhone device provided by Apple Inc. of Cupertino Calif.

Figure 3:
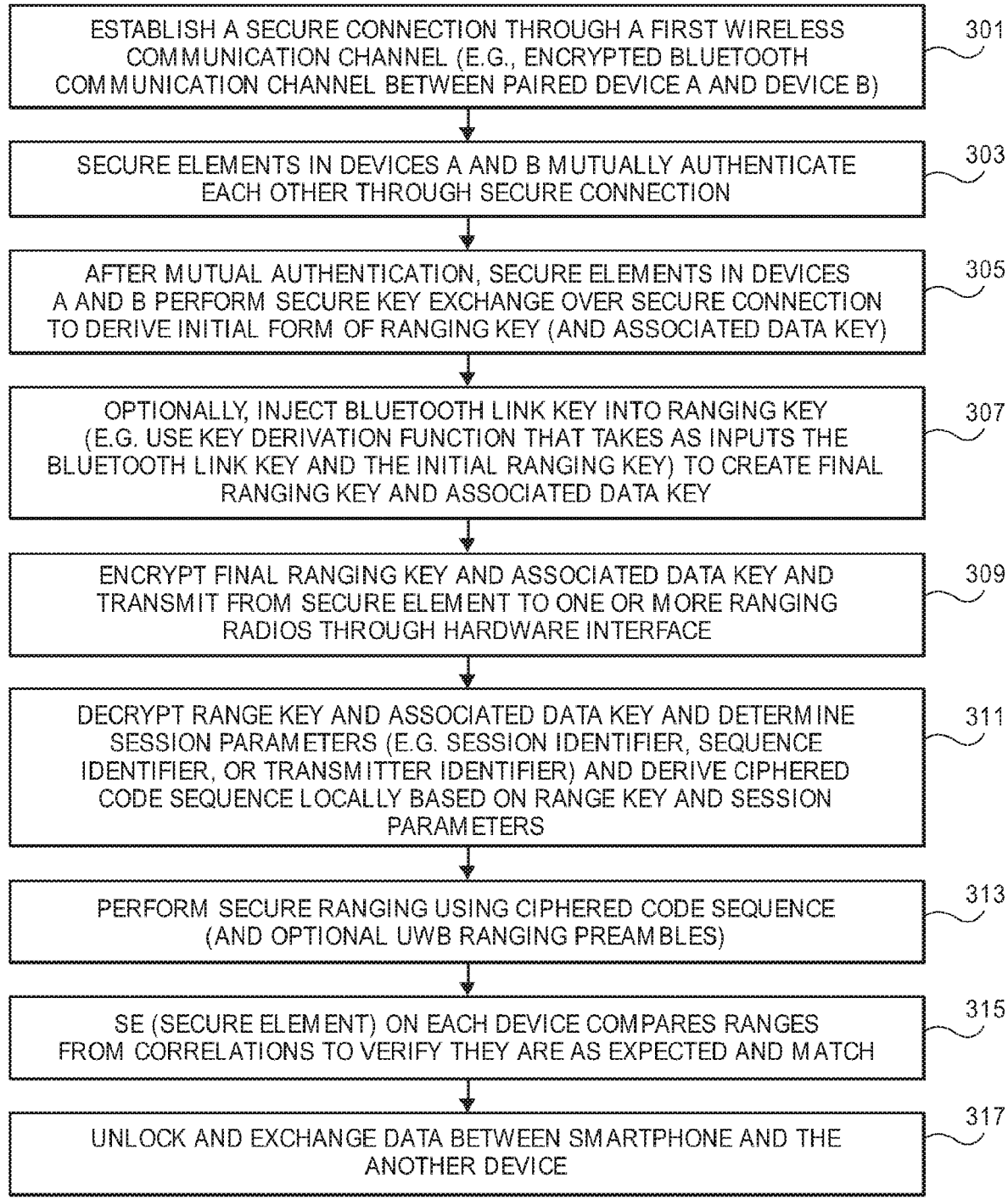
FIG. 3 is a flowchart which illustrates a method according to one embodiment described herein.

FIG. 3 shows a method which can be performed using the ranging system shown in FIG. 2. In addition, this method can use the architecture within each device shown in FIG. 4 in order to locally and separately generate the ciphered code sequence which is used to perform ranging operations in each device. In operation 301, each device, such as Device A and Device B shown in FIG. 2 can establish a secure connection through a first communication channel such as a Bluetooth communication channel between two devices that have been paired using one or more known Bluetooth protocols or using an alternative wireless channel (e.g., WiFi or NFC). Then in operation 303, the secure elements in each device can then mutually authenticate each other through the secure connection established in operation 301. The authentication can be through the use of a shared secret or certificates that are provisioned in manufacturing or that are provisioned in the field into the secure element, such as on confirmation from the end user in response to a query to determine whether the end users trusts a given shared secret or certificate. Such confirmation can come in response to a query such as "do you trust certificate B, signed by manufacturer X, for device with the device identification number XYZ . . . ". It will be appreciated that there are numerous protocols known in the art for performing mutual authentication between two elements or devices, and in this case, the secure elements 207 and 219 or the secure elements 401 and 403 in FIG. 4 can utilize the secure connection established in operation 301 to mutually authenticate each other before proceeding to a secure key exchange operation, such as the operation 305 shown in FIG. 3. In one embodiment, the operation 305 shown in FIG. 3 can be performed in combination with operation 303. After mutual authentication, the secure elements, such as secure elements 207 and 219 or 401 and 403 shown in FIG. 4 perform a secure key exchange over the secure connection to derive one or more initial forms of a ranging key and one or more associated data keys, such as data keys that can be used to encrypt and decrypt time stamp information used in the ranging operations, such as the two way ranging operation shown in FIG. 8 which includes the use of such time stamps. Further additional security can be provided by optional operation 307. In one embodiment, operation 307 can include injecting a Bluetooth link key or other key derived from the secure connection into the ranging key to create a final ranging key and a final associated data key. In one embodiment, a key derivation function can take as inputs the Bluetooth link key and the initial ranging key derived in operation 305 to create a final ranging key or a set of ranging keys depending on the key derivation function. In addition, the associated data key can also be injected with the Bluetooth link key. Then in operation 309, the secure element can encrypt the final ranging key and associated data key using, for example, the public key of the ranging radio which can be stored within the secure element processing system boundary, such as the memory 905 shown in FIG. 9. The encrypted ranging key and associated data key can then be transmitted through a secure interface from the secure element to one or more ranging radios through a hardware interface. This is shown as operation 309, and FIG. 4 shows an example of the secure interface between the secure element and each ranging radio on each device. FIG. 9 also shows the use of the secure interface between the secure element system 903 and the ranging radio 917 which is coupled to the secure element system 903 through a secure interface 919.

Referring back to FIG. 3, in operation 311, the ranging radio receives the encrypted ranging key and encrypted associated data key and decrypts both keys and can then determine session parameters, such as one or more session identifiers, one or more sequence identifiers, and one or more transmitter identifiers and then derive a ciphered code sequence locally in the ranging radio based on the decrypted ranging key and the one or more session parameters. Then, in operation 313, each device can perform secure ranging using the ciphered code sequence and also using the ranging preambles which are part of the IEEE standard 802.15.4a (which can be used to perform ranging in addition to ranging performed using the ciphered code sequence which was locally generated in operation 311). In operation 315 each secure element on each device can compare the ranges obtained from correlations to verify that they are as expected and match. For example, the secure element 401 shown in FIG. 4 can receive range data from controller 423 and also receive range data from the secure element 403 (which obtained the range data from controller 455). If these ranges match within a predetermined tolerance and the ciphered code sequences were as expected and match, then each secure element can decide that it has securely performed the range operation with the other device which has been authenticated and thus can perform additional cryptographic operations or data exchange operations or other operations (see operation 317 in FIG. 3) after verifying the secure connection and secure ranging has been performed. For example, the secure ranging (after operation 315) can cause the Device B to perform cryptographic operations that cause the Device B to unlock itself, and both the Device B and the smartphone or wearable device can then exchange data between the devices such as the user's identity, user's preferences (e.g., lights to turn on), a destination, new or modified contact information, etc. In other embodiments, the secure ranging can result in unlocking of the computer or other data processing system or performing another operation which has been designated to be an operation performed after a successful ranging between the two devices.

Variations on operation 315 can be performed in some embodiments. In one embodiment, correlations are performed within one or more of the ranging radios and only a range value is communicated to the secure elements. In one embodiment, the ranging operations can be finalized by one of the devices, with the results securely communicated to the other device. Other embodiments can perform various combinations of these embodiments.

In practice, the method shown in FIG. 3 can allow a user of a smartphone or other data processing system (such as a smart watch or other wearable device) (Device A), to walk up to the another device (Device B) and have the another device unlock itself in response to authenticating the smartphone and performing a secure ranging operation with the smartphone as described herein. In one embodiment, the user may be able to walk up to the another device (Device B) without touching the another device (Device B) and cause the another device (Device B) to unlock itself; in another embodiment, the user may be required to touch the another device (Device B), such as the house's door handle in order to cause the another device (Device B) to unlock. In addition to unlocking the another device (Device B) or as an alternative to unlocking the another device (Device B), the phone or watch can also be used to allow the user to turn on a function or system in the another device, make changes to settings in the another device, or any other operations that may be performed with the another device.

In one embodiment, the secure ranging operation 313 can include, on the transmit side of a sequence, the transmission of the ciphered code sequence and one or more encrypted time stamps. On the received side of a sequence, the device will be locally deriving, contemporaneously with the correlation operation, the ciphered code sequence and will correlate the ciphered code sequence which is locally derived with the received code sequence to perform secure ranging. This can be seen in FIG. 4 as each device locally and independently generates the ciphered code sequence contemporaneously with the receipt of a ciphered code sequence. If the code sequences do not match then the ranging radio can alert the secure element that an attacker is attempting to foil the system and is attempting to get access to, for example, the another device. In the system shown in FIG. 4, Device A includes the secure element 401, which can be the secure element system 903 or the secure element system 1005, and also includes a ranging radio 415 which is coupled to the secure element 401 through a secure interface 405. Similarly, Device B includes a secure element 403 which can be similar to the secure element system 903 or the secure element system 1005, and ranging radio 417 which is coupled to the secure element 403 through the secure interface 407. The secure interfaces 405 and 407, in one embodiment, are secure interface circuits that provide enhanced security to the data connection between the ranging radios and the secure elements.

In the example shown in FIG. 4, the secure element through a setup process 402 creates one or more ranging keys and one or more associated data keys, such as the keys 409 and 411 (wherein the ranging key is denoted as K_AB_R and the associated data key is denoted as K_AB_D). The setup process 402 can in one embodiment use the operations 301 through 309 to generate the ranging key and associated data key in an encrypted form and then transmit the encrypted keys through the secure interface to the corresponding ranging radio on the device. For example, the secure element 401 can encrypt the ranging key and the associated data key with the public key of the ranging radio 415 and transmit that encrypted set of keys to the ranging radio which can then decrypt both keys (using the ranging radio's private key) and then use the keys in the manner described herein to generate the ciphered code sequence which can be the same as operation 311 in one embodiment.

In the example shown in FIG. 4, the generation of the ciphered code sequence is performed separately and independently on each side (i.e. in Device A separately and independently from Device B). Ranging radio A, for example will receive the encrypted ranging key and associated data key and will decrypt the keys. The ranging key can then be combined with the session parameters, such as a session identifier or sequence identifier or transmitter identifier or a combination of such session parameters to create a seed 419 and this seed can then be used as an input to a random number generator 421. The seed 419 can be a concatenation (or other combination) of the ranging key and the one or more session parameters.

In various embodiments, the random number generator 421 can be a pseudo random number generator (PRNG), such as a deterministic random bit generator (DRBG), or can be implemented using a pseudo random function (PRF) family In such embodiments, the random number generator 421 is configured to operate in a deterministic manner, to generate the same sequence of random numbers for a given seed. The sequence of random numbers can be generated by using a counter or other incrementer to cause the random number generator 421 to output the sequence of random numbers, as outputs 431, based upon a particular seed. Those outputs 431 can then be further processed in one embodiment by a preamble code selector, cyclic shifter and polarity changer 429 which can select a preamble code, cyclic shift the output and also invert polarity of one or more bits in one embodiment.

The result of the output from the cyclic shifter 429 can then be provided to either the correlator 425 or to the RF transceiver 427. When ranging radio A is transmitting to the other ranging radios, then the output from cyclic shifter 429 is provided through output 434 to the transmitter of the RF transceiver 427 to allow the transmission of the ciphered code sequence for receipt by the other ranging radios, such as ranging radio 417. When the ranging radio 415 is receiving ciphered code sequences, then the receiver in the RF transceiver 427 provides an output 433 which is the received code sequence to the correlator 425 which also receives the output 435 from the cyclic shifter 429 to perform the conventional correlation operation in the correlator 425 to determine whether the ciphered code sequence matches the locally generated ciphered code sequence on output 435 and also to perform a ranging operation using techniques that are known in the art. The output of the correlation operation by correlator 425 can be provided to controller 423 which can indicate both the range and also whether or not the ciphered code sequences match (in which case the two devices are not being attacked). The controller 423 can provide the session parameters to be combined into the seed 419 as described herein and can also communicate with the secure element 401 to indicate whether the secure ranging operation was successful. The ranging radio 417 works in a similar fashion as the ranging radio 415 and includes similar elements such as a random number generator 453 which produces outputs 463 which can then be shifted and inverted using the cyclic shifter 461 to provide two outputs, one to the correlator 457 and the other to the RF transceiver 459. A controller 455 can provide and keep track of the session parameters which can be provided as an input along with the ranging key to create the seed 451 which becomes the input to the deterministic random number generator 453.

In one embodiment, parameters that specify the particular preamble code, cyclic shift and polarity change for a particular output from the deterministic random number generator (DRNG) can be included within one or more portions of the particular output from the DRNG (e.g., random number generators 421 and 453), and these parameters can be used by the cyclic shifter (e.g., preamble code selector, cyclic shifter and polarity inverters 429 and 461) to perform the particular shift and inversion specified by these portions of the particular output from the DRNG.

For example, one field within the particular output can specify a particular preamble code (that is random 1 of 96) particular cyclic shift (that is random) and another field can specify a particular polarity inversion (that is random), and thus the cyclic shifts and polarity inversions vary as the random outputs from the DRNG vary. In this way, additional variability is injected into the locally derived code sequences. This also insures that each side (i.e., devices A & B) of the ranging system will produce the same preamble code, cyclic shift and polarity inversion for each particular output from the DRNG. It will be appreciated that each side in the ranging system will, in one embodiment, produce the same outputs from the DRNG for a given ranging key and set of session parameters.

In one embodiment, multiple outputs from the DRNG and shifter/inverters 429 and 461 can be combined to generate a long, non-repetitive sequence; in other words, some large number of outputs (e.g., 512) from the DRNG and preamble code selector, the cyclic shifter and polarity inverters 429 and 461 can be concatenated to create the ciphered code sequence and that ciphered code sequence is used for just one of the sequence identifiers in a session. For the next sequence identifier in the session, another set of 512 outputs can be generated. These operations make it very hard to duplicate or predict the sequence.

In one embodiment, various techniques may be implemented to harden against side-channel attacks on the system. A side-channel attack is an attempt to compromise the security of the system based on information leaks from physical implementation of the system, (e.g., power consumption, electromagnetic leaks, etc.) and can be resisted by reducing information leakage or eliminating correlations between the leaked information and secret information. Resistance against side-channel attacks can be implemented at various points within the cryptographic processes. In one embodiment, overall performance of the system can be improved by focusing protection against side-channel attacks to the construction of the initial state of the DRNG. Once the process to generate the initial state is hardened against side-channel attacks, a cryptographically secure DRNG can be used, which reduces or eliminates the need to implement side-channel countermeasures during the DRBG generation phase and enables improved performance of cryptographic operations. In one embodiment, side-channel resistance can be enabled by concentrating the key derivation with the parameters into a single step, allowing side-channel protection of this stage only. In one embodiment, side-channel resistance can be enabled by cascading the derivation for each parameter, which limits the number of times each intermediary result varies. For example, the key derivation function (KDF) can compute a Seed in a cascaded manner based on a ranging key (key) and a set of parameters (param1, param2, param3), such that Seed=KDF(KDF(KDF (key, param1), param2), param3). Such cascade can reduce the need for side-channel protection of the key derivation function because the attacker can capture a smaller amount of input or output for the function.

Figure 6A:
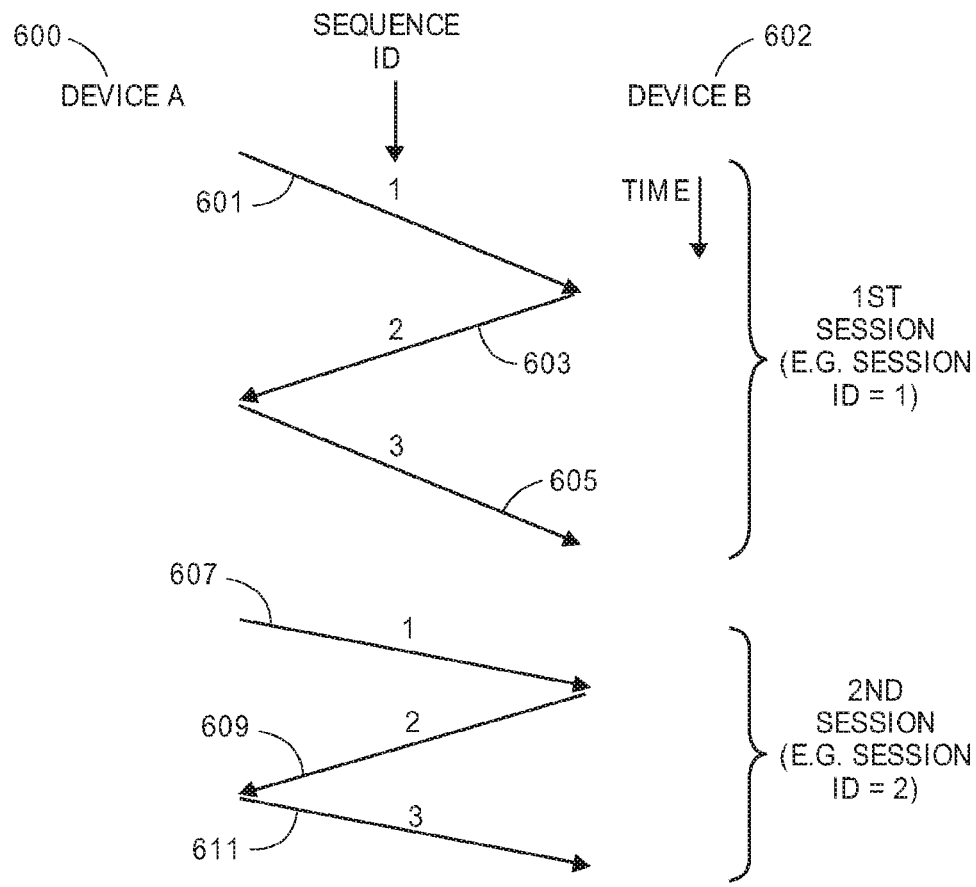
FIGS. 6A, 6B, and 6C show three examples of two way ranging operations between two devices such as a smartphone and another device which is unlocked with the smartphone.
Figure 6B:
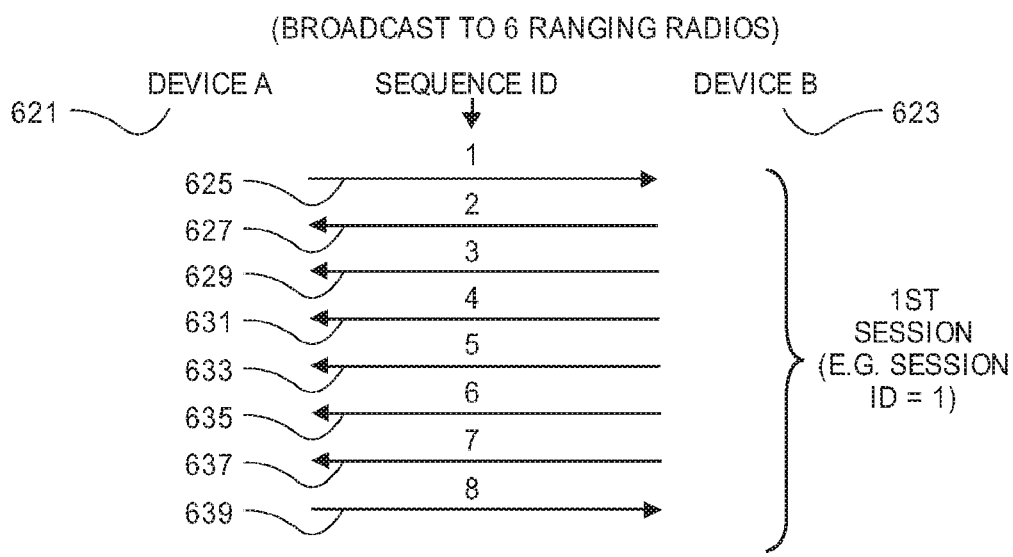
Figure 6C:
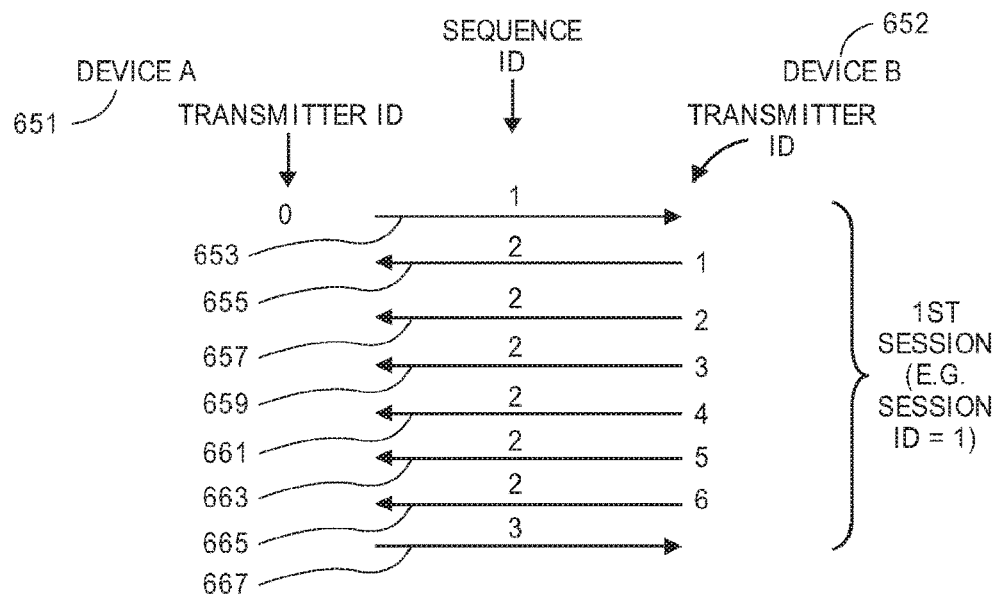

The method shown in FIG. 3 and the architecture shown in FIG. 4 can be performed with session parameters which introduce an additional random parameter into the operations in order to frustrate attackers attempting to fake a secure ranging operation. A controller in each device or the secure element in each device can maintain and control the session parameters based upon the secure key exchange or other communications between the two devices. In the example shown in FIG. 6A, two separate sessions, each with separate session identifiers, are shown as two separate two way ranging operations. In the first session between device 600 and 602, a transmission 601 from device 600 goes to device 602 and the device 602 responds with transmission 603 back to the device 600 which in turn responds through sequence identifier 3 (shown as transmission 605) to the device 602. In the case of a failed transmission or failed session, the session can repeat as a second session with the second (and different) session identifier and include three transmissions 607, 609, and 611 each with a particular sequence identifier number. For example, transmission 609 from device 602 to device 600 is shown with a sequence identifier 2 which can be used as an input along with the ranging key to create a seed from both values which in turn can generate an output from a deterministic random number generator and then the output key is further processed by for example a preamble code selector, cyclic shifter and polarity changer to derive a ciphered code sequence. FIGS. 6B and 6C show an example in which a single device with a single ranging radio, such as a smartphone, broadcasts to one or more ranging radios on another device, such as a mobile system. In the example shown in FIG. 6B, Device A transmits the broadcasts to all six sensors (ranging radios) on the mobile system in transmission 625. In response, the ranging radios are configured to respond in sequence in a predetermined order (in order to avoid RF collisions) and also to ensure that each side knows the sequence identifier associated with the transmission. Thus, transmission 627, 629, 631, 633, 635, and 637 are from different ranging radios on the mobile system and each has an associated different sequence identifier which can be used as an input to create the seed along with the ranging key. For example, the ranging key and the sequence identifier can be concatenated or otherwise combined to create a seed so that the ciphered code sequence is different for each sequence or transmission in the series 627 through 637. After transmission 637, the device 621 responds with transmission 639 which is shown having a sequence identifier 8 which again is used as an input along with the ranging key to create a seed which in turn is used an input to a deterministic random number generator in the architecture shown in FIG. 4.

FIG. 6C shows another example of a broadcast to six ranging radios from device 651. The example shown in FIG. 6C is similar to the example shown in FIG. 6B except that a transmitter identifier is used. Thus each ranging radio on the device 652 has a transmitter identifier which is used along with the ranging key to create the seed which in turn is used as an input to the deterministic random number generator as described above. Thus transmission 655 through 665 shares the same sequence identifier number but have different transmitter identifier numbers which will cause a generation of a different seed. FIG. 5B shows an example of how the ranging key, such as the ranging key as part of the keys 409 and the session parameters are provided as an input to a seed generator 525 which generates a seed which is then used as an input to a deterministic random number generator.

Figure 7:
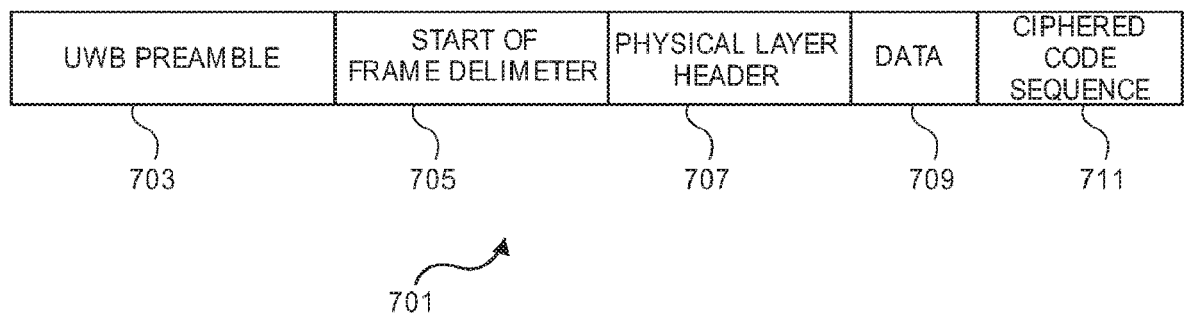
FIG. 7 shows an example of a data packet according to one embodiment which includes an additional code sequence which can be the locally derived code sequence which is derived based upon the ranging key and one or more session parameters as described herein.

FIG. 7 shows an example of a packet which is based upon the IEEE 802.15.4a standard. The packet 701 can include a conventional UWB preamble 703 which can be used to perform conventional ranging operations. In addition, the packet can include a start of frame delimiter 705 which can be used in a conventional manner In addition the packet 701 can also include data 709 and a physical layer header 707. The ciphered code sequence 711 in one embodiment can be the locally generated ciphered code sequence produced in operation 311 of FIG. 3 or output by the cyclic shifter 429 and the cyclic shifter 461 and is used in the correlation operations described herein to perform secure ranging using the ciphered code sequence, such as the secure ranging performed in operation 313. In one embodiment, two separate correlation operations can be performed using the packet 701 shown in FIG. 7. In particular, a correlation operation to perform ranging operations can be performed using the UWB preamble 703 and a second correlation operation to perform secure ranging can be performed using the ciphered code sequence 711. In one embodiment, the two different correlation operations can be compared to verify the security of the system. Normally, the ranging operations if the system is secure and not being attacked should match with a predetermined tolerance.

Figure 5A:
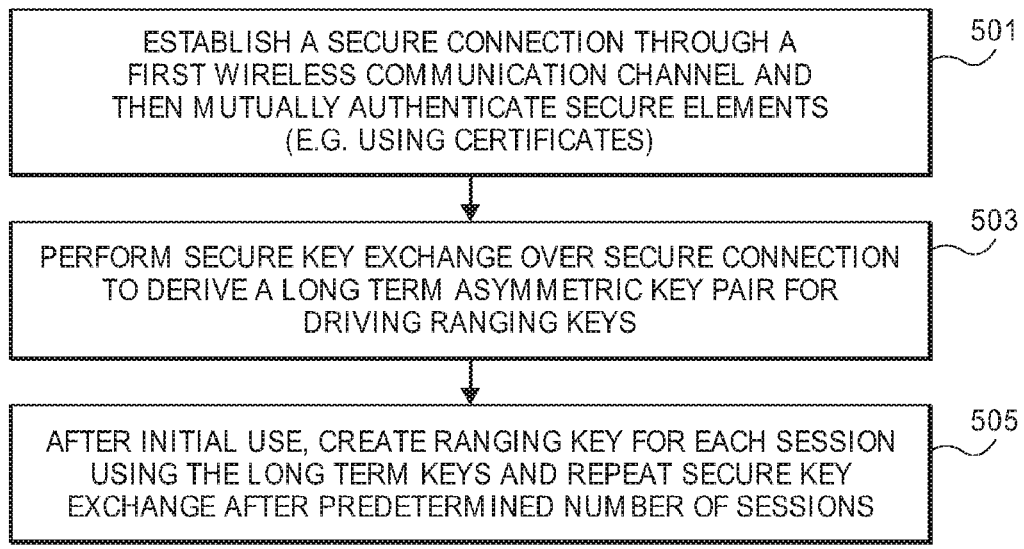
FIG. 5A is a flowchart which illustrates a method according to one embodiment for generating ranging keys over an extended period of time.
Figure 5B:
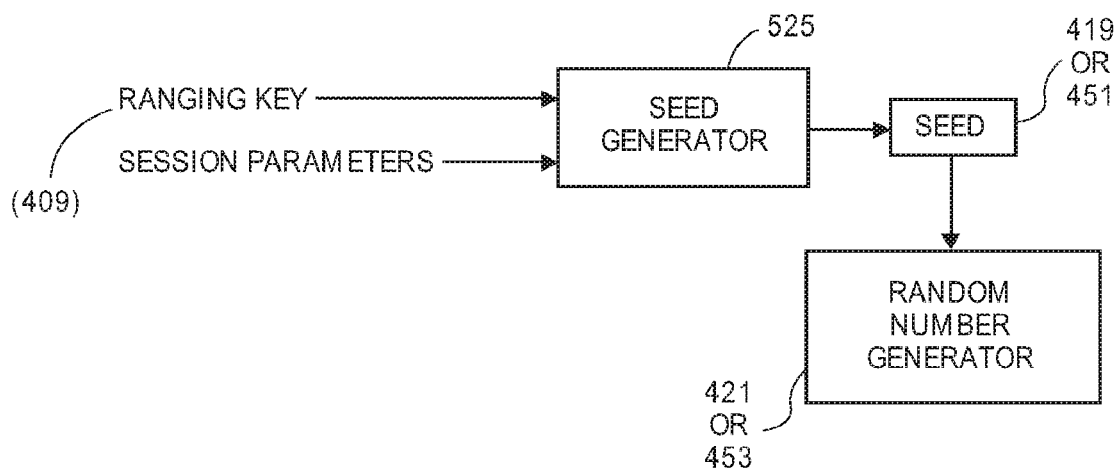
FIG. 5B shows an example according to one embodiment for generating a seed for use with a deterministic random number generator.

FIG. 5A shows an example of how different cryptographic protocols can be performed over time. In particular, in operation 501 a secure connection can be established through for example a Bluetooth connection and this is similar to operation 301. Then, a secure key exchange can be performed in operation 503 to derive a long term symmetric key pair (e.g., MK_AB) for deriving ranging keys. Then in operation 505 after initial use session keys for use as ranging keys can be derived using the long term key which may be discarded after a predetermined number of sessions such that operation 503 is performed again to derive another long term symmetric key pair for deriving ranging keys and then operation 505 is repeated.

In one embodiment, operations can be performed in which a secure element in the another device (e.g., Device B) can be paired with a secure element in a mobile phone device using the same long term symmetric key. Session keys can then be established based on the long term keys. The ranging key can then be derived from the session key with or without contribution from the Bluetooth session key or other keys established by a first communication channel. Authenticating using the long term symmetric key may be performed quickly, but may expose the long term symmetric key if the key is used too many times.

In one embodiment, a secure element in the another device (e.g., Device B) and a mobile phone device or watch each has long term asymmetric key pairs. The secure elements may pair by exchanging public keys. A session key can be established directly based on the asymmetric long term keys using, for example, SCP11 or another secure channel protocol for use with asymmetric long term keys. The ranging key can be derived from the session key with or without contribution from the BT session key. Use of a long term asymmetric key may have performance disadvantages relative to the use of a long term symmetric key, but may be more secure.

In one embodiment a mid-term symmetric key is periodically established between secure elements. Session keys can be established based on the mid-term keys using, for example, SCP03 or another secure channel protocol that makes use of symmetric keys. The ranging key can then be derived from the session key with or without contribution from the BT session key. In one embodiment, secure elements can occasionally perform an operation using the asymmetric key to generate a new long term symmetric key (MK_AB).

FIG. 9 shows an example of a system which includes a secure element and an application processor and one or more ranging radios and one or more other radios, such as a Bluetooth radio. The system shown in FIG. 9 can be used as device 201 in one embodiment or Device A shown in FIG. 4. Moreover, the system shown in FIG. 9 can also be used in Device B which includes a secure element system with one or more ranging radios and which can include one or more application processors to provide navigation and radio or entertainment controllers and other functionality to users of Device B. In one embodiment, the secure element system 903 can be implemented as a system on chip. In another embodiment, the application processor 921 and the secure element system 903 can be implemented on a system on chip and include one or more processors and memory controllers and other components on a single integrated circuit. In the example shown in FIG. 9, the secure element system 903 can perform cryptographic operations such as encrypting user files or verifying code signatures or processing user passcodes or performing other security operations by executing the software stored as firmware 911 in the secure element system 903. The firmware 911 can store executable program instructions which execute on the secure element processor 915 to provide the cryptographic operations or functions. The secure element processor 915 can also be coupled to a secure element ROM 913 which can be trusted software that can validate the software in the firmware 911 before allowing that firmware to execute by checking a code signature of the firmware and verifying that the signature code indicates that the firmware is valid and has not been corrupted before allowing the firmware to be executed by the secure element processor 915. The secure element system 903 can also include a cryptographic accelerator such as cryptographic accelerator 907 which can perform asymmetric cryptography as well as symmetric cryptography using a hardware accelerator. The accelerator 907 can be coupled to non-volatile and immutable memory 905 which can store in a secure manner a device identifier or a set of device identifiers and a set of one or more certificates and private keys which are hidden from the rest of the system and are not readable by the rest of the system in one embodiment. The cryptographic accelerator 907 has access to the private keys and other data within the memory 905 and access to the memory 905 is not allowed for components outside of the secure element system 903. The lack of access to memory 905 is one reason why the secure element system 903 can be considered "secure." In one embodiment, the accelerator 907 can be coupled to an accelerator memory 909 which can be a scratch pad memory used to perform the cryptographic operations that are performed by the cryptographic accelerator 907. The system 901 includes in the embodiment shown in FIG. 9 a secure interface 919 which can be an in-box and an out-box that allows communication between the application processor 921 and the secure element processor 915. In one embodiment, the one or more ranging radios 917 can also be coupled to the secure interface 919 to permit the secure processor 915 to communicate with the one or more ranging radios 917. The application processor 921 can be coupled to one or more buses 923 which are coupled to one or more input and output devices 927, such as a touchscreen display and a Bluetooth radio, other radios such as WiFi and NFC radios, etc. The examples of the input and output devices 927 depend upon the device and can include other input or other output devices. The application processor 921 is also coupled to an application processor ROM or read only memory 925 which provides software to boot up the application processor. Similarly, the secure element ROM 913 provides code to boot up the secure element processor 915.

In an alternative embodiment, a first wireless communication channel between Bluetooth or WiFi transceivers in a first device (e.g., Device A such as a smartphone or watch) and a second device (e.g., Device B) is used to establish a secure connection between the two transceivers. After the first wireless communication channel is established and is secured, then a first secure processing system (a secure element processor) in the first device and a second secure processing system (another secure element processor) in the second device exchange data to authenticate each other (a 2-way authentication, where each secure element processor authenticates the other secure element processor). Then the first and second secure processing system perform a secure key exchange to derive one or more keys for use in a near field communication between NFC radios in the first and second devices. The NFC radios in this embodiment use the derived keys to allow each NFC radio within each device to verify that the other NFC radio in the other device is securely authenticated, and thus allows the first device to open a door on the second device or perform other operations on the second device. Thus, the NFC radios in the first and second devices take the place of the ranging radios in, for example, FIG. 2, and the NFC radios can have an operating distance of less than 10 or 50 or 100 centimeters such that longer range use is not possible (and hence remote attacks beyond one of these distances is not possible).

Figure 10:
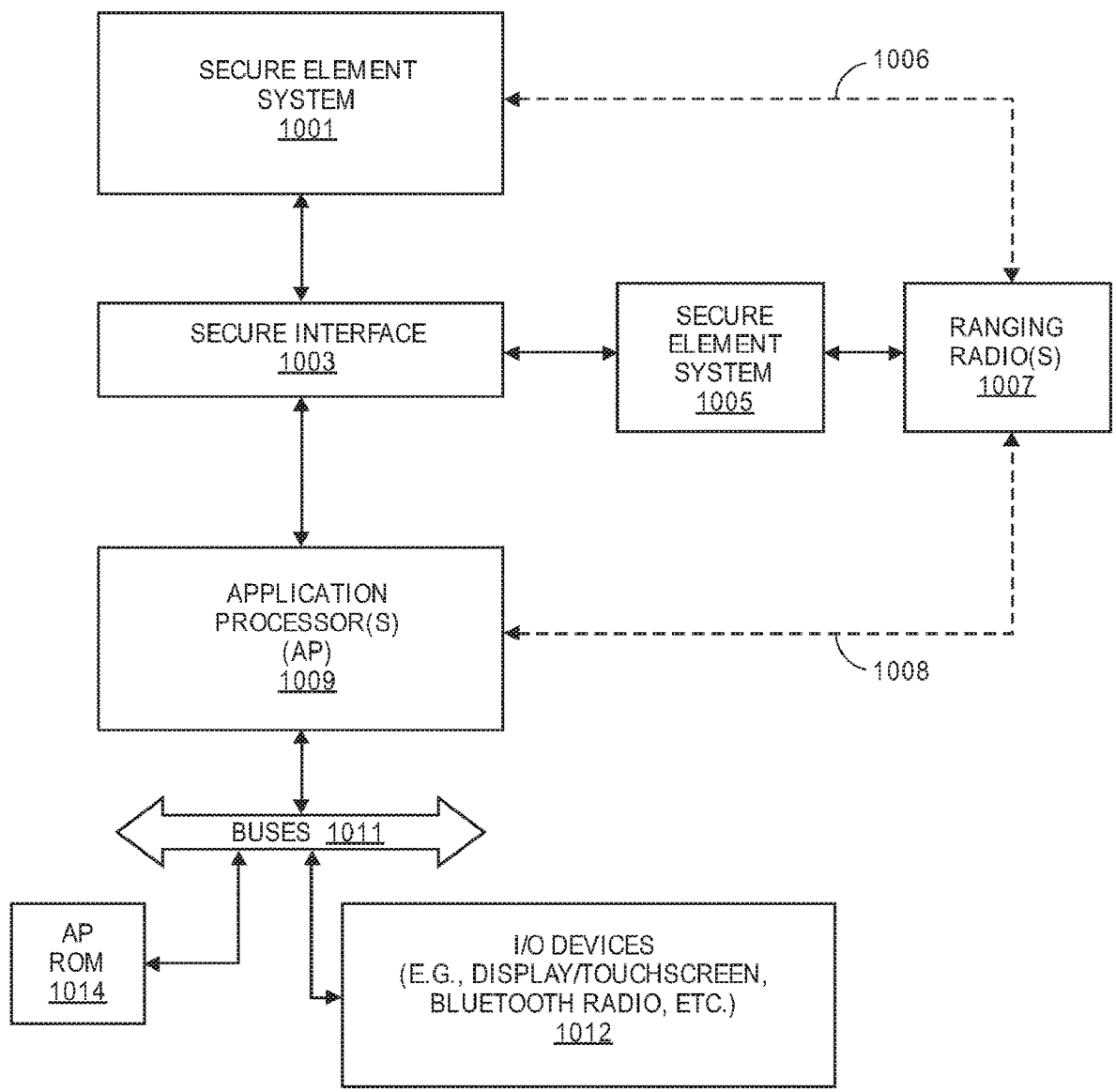
FIG. 10 is a block diagram of another example of a data processing system which includes a secure enclave processing (SEP) system and a separate secure element to operate securely with a ranging radio.

FIG. 10 shows an example of an alternative to the system shown in FIG. 9. In the system shown in FIG. 10, there are two secure elements 1001 and 1005 and an application processor(s) 1009 and one or more ranging radios 1007 and one or more other radios (such as a Bluetooth radio, WiFi radio, Near Field Communication radio, cellular telephone radio, etc.). The one or more other radios can be part of I/O (input/output) devices 1012. The system in FIG. 10 can be used as device 201 or Device A in FIG. 4 in one embodiment. The application processor(s) 1009 can be similar in structure and function to the application processor 921, and the AP ROM 1014 and the buses 1011 can be respectively similar in structure and function to the AP ROM 925 and buses 923. The secure element system 1001 can be similar in structure and function to the secure element system 903 and can be coupled to the application processor(s) 1009 through a secure interface 1003 that allows encrypted communication through, in one embodiment, an in-box and an out-box. The secure interface 1003 is also coupled to secure element system 1005 which can provide at least some of the secure element processing for the ranging radio(s) 1007 instead of requiring that the secure element system 1001 provide all of the secure element processing for ranging radio(s) 1007. For example, the secure element system 1001 can authenticate code signatures at boot up of the system in FIG. 10 and can authenticate the secure element system 1005, and then after being authenticated by the secure element system 1001, the secure element system 1005 can perform secure element processing for ranging radio(s) 1007 by performing, for example, operations 303 through 315 in FIG. 3. In another embodiment, the secure element system 1005 can perform a smaller subset of these operations. Using the secure element system 1005 instead of secure element system 101 for most of these operations can allow the secure element system 1001 (and also the application processor(s) 1009) to remain in a sleep or low power state in one embodiment after the secure element system 1005 has been authenticated by the secure element system 1001. In one embodiment, the connection between secure element system 1005 and the ranging radio(s) 1007 can be a hardware connection that uses authenticated and encrypted communications between the secure element system 1005 and the ranging radio(s) 1007. In the embodiment shown in FIG. 10, the secure element system 1001 and the application processor(s) 1009 communicate with the secure element system 1005 through the secure interface 1003, and the system 1001 and processor(s) 1009 communicate with the ranging radio(s) 1007 indirectly through the secure element system 1005; in addition or as an alternative, the ranging radio(s) 1007 can communicate encrypted messages with secure element system 1001 and application processor(s) 1009 through direct connections shown as connections 1006 and 1008.

A secure element system can be a processing system within another data processing system. For example, the secure element system can be the secure enclave co-processor in certain iPhones from Apple Inc. of Cupertino, Calif.; this co-processor executes its own secure boot-up process (separate from the main application processor's secure boot-up) and executes security protocols related to processing of user passcodes, fingerprints, etc. Further information about embodiments of secure element systems can be found in U.S. Provisional Patent Application Nos. 62/276,913 filed Jan. 10, 2016 and 62/171,705 filed Jun. 5, 2015, and both of these U.S. provisional patent applications are incorporated herein by reference. Embodiments of secure element systems are also described in U.S. Patent Application Publication No. US 2014/0089682 A1 which is also incorporated herein by reference.

In the foregoing specification, specific exemplary embodiments have been described. It will be evident that various modifications may be made to those embodiments without departing from the broader spirit and scope set forth in the following claims. The specification and drawings are, accordingly, to be regarded in an illustrative sense rather than a restrictive sense.

What is claimed is:

1. A data processing system comprising:
a first radio transceiver configured to transmit a locally generated pseudorandom ranging code and to use a locally generated code sequence for correlation with a received ranging code to determine a range between the data processing system and an another system;
an application processor configured to process one or more user applications;
a secure element coupled to the application processor and coupled to the first radio transceiver through one or more hardware buses, the secure element configured to establish an encrypted communication channel, within the data processing system, between the first radio transceiver and the secure element to provide one or more ranging keys to the first radio transceiver through the encrypted communication channel to allow the first radio transceiver to generate the locally generated pseudorandom ranging code;
a second radio transceiver coupled to the application processor and to the secure element, the second radio transceiver configured to provide communications between the another system and the data processing system; and
wherein the data processing system is a wearable device which performs cryptographic operations after a secure ranging operation, based on the ranging keys, between the wearable device and the another system, the cryptographic operations performed during a data communication between the wearable device and the another system, and wherein the another system is not a motorized vehicle.

2. The data processing system as in claim 1, wherein the data communication includes a transmission or reception of data associated with a user of the data processing system.

3. The data processing system as in claim 2, wherein the data associated with the user is processed by the one or more user applications that execute on the application processor.

4. The data processing system as in claim 3, wherein the second radio transceiver transmits or receives the data associated with the user after the secure ranging operation that is based on the ranging keys.

5. The data processing system as in claim 4, wherein the wearable device contains the first radio transceiver, the application processor, the secure element, and the second radio transceiver.

6. The data processing system as in claim 5, wherein the secure ranging operation provides a proximity assurance or verification before the data associated with the user is communicated.

7. The data processing system as in claim 6, wherein the secure element verifies a code signature of software stored in a non-volatile memory coupled to the application processor before the software is allowed to execute.

8. The data processing system as in claim 6, wherein the secure element processes user passcodes.

9. The data processing system as in claim 6, wherein the secure element system includes a secure processor, secure processor firmware, a secure boot read only memory (ROM), a cryptographic accelerator, and secure storage for storing one or more private keys for use in cryptographic operations.

10. The data processing system as in claim 9, wherein the application processor is coupled to a boot ROM and one or more system buses, the application processor configured to execute an operating system.

11. The data processing system as in claim 10, wherein the wearable device is a watch.

12. The data processing system as in claim 10, wherein one of the one or more ranging keys is encrypted, by the secure element, with a public key of the first radio transceiver, and the first radio transceiver decrypts the encrypted ranging key with a corresponding private key of the first radio transceiver.

13. A method to transmit a locally generated pseudorandom ranging code and to use a locally generated code sequence for correlation with a received ranging code to determine a range between a data processing system and an another system, the method comprising:
transmitting, with a first radio transceiver, a locally generated pseudorandom ranging code and to use a locally generated code sequence for correlation with a received ranging code to determine a range between the data processing system and an another system;
establishing, with a secure element, an encrypted communication channel, within the data processing system, between the first radio transceiver and the secure element to provide one or more ranging keys to the first radio transceiver through the encrypted communication channel to allow the first radio transceiver to generate the locally generated pseudorandom ranging code; and
providing, with a second radio transceiver, communications between the another system and the data processing system, wherein the data processing system is a wearable device which performs cryptographic operations after a secure ranging operation, based on the ranging keys, between the wearable device and the another system, the cryptographic operations performed during a data communication between the wearable device and the another system, and wherein the another system is not a motorized vehicle.

14. The method of claim 13, wherein the data communication includes a transmission or reception of data associated with a user of the data processing system.

15. The method of claim 13, wherein the data associated with the user is processed by one or more user applications that execute on the application processor.

16. The method of claim 13, wherein the providing further comprises:
transmitting or receiving, with the second radio transceiver, the data associated with the user after the secure ranging operation that is based on the ranging keys.

17. The method of claim 16, wherein the wearable device contains the first radio transceiver, the application processor, the secure element, and the second radio transceiver.

18. The method of claim 17, wherein the secure ranging operation provides a proximity assurance or verification before the data associated with the user is communicated.

19. The method of claim 18, wherein the establishing further comprises:
verifying a code signature of software stored in a non-volatile memory coupled to the application processor before the software is allowed to execute.

20. A non-transitory machine-readable storage medium, the machine-readable storage medium including instructions that when executed by a computer, cause the computer to:
transmit, with a first radio transceiver, a locally generated pseudorandom ranging code and to use a locally generated code sequence for correlation with a received ranging code to determine a range between the data processing system and an another system;
establish, with a secure element, an encrypted communication channel, within the data processing system, between the first radio transceiver and the secure element to provide one or more ranging keys to the first radio transceiver through the encrypted communication channel to allow the first radio transceiver to generate the locally generated pseudorandom ranging code; and
provide, with a second radio transceiver, communications between the another system and the data processing system, wherein the data processing system is a wearable device which performs cryptographic operations after a secure ranging operation, based on the ranging keys, between the wearable device and the another system, the cryptographic operations performed during a data communication between the wearable device and the another system, and wherein the another system is not a motorized vehicle.

* * * * *